United States Patent [19]

Morgan

[11] Patent Number: 4,850,758
[45] Date of Patent: Jul. 25, 1989

[54] QUICK-CHANGE DRILL BITS AND HOLDER

[76] Inventor: William W. Morgan, 8903 Granada Hills Dr., Austin, Tex. 78737

[21] Appl. No.: 271,430

[22] Filed: Nov. 15, 1988

[51] Int. Cl.⁴ .................. B23B 51/02; B23B 31/06
[52] U.S. Cl. .................. 408/226; 279/1 A; 279/1 M; 408/239 A; 408/241 R
[58] Field of Search .................. 279/1 A, 1 M, 1 ME, 279/1 B, 95, 96, 102, 103; 408/239, 241 R, 226, 239 R; 81/125, 437-439

[56] References Cited

U.S. PATENT DOCUMENTS 2,667,194  1/1954  Fischer et al. .................. 81/438
3,007,504  11/1961  Clark .................. 279/1 M X Primary Examiner—Steven C. Bishop

[57] ABSTRACT

This is an improved method for quickly changing and holding drill bits in electric drills. It includes hexagonal-ended drill bits and a holder with safety device for the bits. The holder is a steel sleeve with a male hexagonal end for insertion into ¼" and larger drills. The opposite end is a female hex to receive the hex-ended drill bits. The holder is magnetized to hold the bits. The holder also supports a spring loaded two-piece safety split sleeve device surrounding the holder. The drill bit end of the split sleeve is folded over a fit into a circular groove in the drill bit and is held firmly in the groove by spring tension. This device keeps the bit in the holder when removing the bit from the material being worked. The split sleeves pivot at their attachment point to the holder, thus permitting rapid changing of drill bits (and other hex accessories) by simply squeezing the chuck end of the split sleeves causing them to pivot, thus opening the opposite end so that bits can be inserted and removed. The hex size of the drill bits and holder in this invention, for reasons of safety, is larger than the hex accessories currently on the market.

2 Claims, 2 Drawing Sheets

QUICK-CHANGE DRILL BITS AND HOLDER

BACKGROUND

This invention relates in general to electric drill accessories and in particular to a quick-change system for changing drill bits.

Most drills require a chuck key to open the chuck for inserting a drill bit and then the chuck must be closed on the drill bit with the same key. Some drills come with a collar that must be held with one hand while operating the motor, to open or close the chuck. The forward-/reverse switch must be operated to open chuck and then operated in other direction to close. About all this latter system does is eliminate the need for a chuck key, the process is certainly not fast.

Keeping up with a chuck key can be a real inconvenience. Even when its whereabouts is known it can require walking several steps to get it and then return it after it has been used. Attaching the key to the drill cord is not satisfactory because it can catch on things and is awkward to use. If a key is properly used, it is inserted in each hole (3 in all) around the chuck and progressively tightened. However it is used, it requires an inordinate amount of time to change bits and to keep up with.

With this invention, once the holder is in the drill, all that is required to change drill bits is to squeeze the split sleeves and insert or remove the bit. With screwdriver bits sized to fit this holder, a pilot hole can be drilled and a screw driven therein very quickly. Such a process with conventional drill bits is very time consuming.

SUMMARY

The magnetic holder with its split safety feature, in conjunction with the hex-ended drill bits, greatly speed up the process of changing bits. The system all but eliminates the use of a chuck key. Time saving and convenience are the primary advantages of this invention. The magnetic holder allows the bit to wobble a bit when running free but this is no problem. Metal should be indented with a punch before drilling. It is a good idea to do it in wood also. This prevents the drill bit from "skating". The drill bit is then placed in the indentation before turning the drill motor on, thus wobble is prevented. Most woods can be indented simply by pushing the drill bit into the wood before turning the drill motor on.

The split sleeve safety feature prevents the drill bit from slipping out of the holder when removing the drill bit from the material being worked, which could cause injury if drill bit were still turning at high speed.

The hex drill bits and holder would have a larger hex size than the hex accessories (screwdriver bits, etc) currently in use to prevent the use of the drill bits in holders not having the safety split sleeve device.

It is obvious that the holder can be used with other hex-ended accessories such as screwdriver bits, sockets, hex keys and more which would be sized to fit the larger sized hex holder. In addition to quickly changing drill bits, a pilot hole can be drilled, the drill bit can be swapped with a screwdriver bit and a screw driven into pilot hole all in a fraction of the time it would take to use the standard chuck and drill bits.

DESCRIPTION OF THE PREFERRED EMBODIMENT

Figure 1:
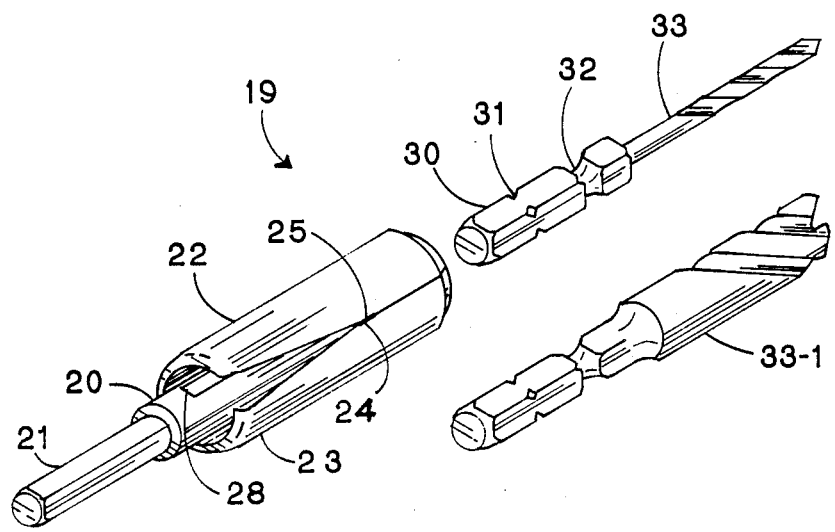
FIG. 1 is a perspective view of drill bit holder with attached split sleeves and hex-ended drill bit according to a typical embodiment of the present invention.

To promote a better understanding of the principles of this invention, reference will be made to the embodiment illustrated in the drawings and specific language will be used to describe the same. It will nevertheless be understood that no limitation of the scope of the invention is thereby intended, such alterations and further applications of the principles of the invention as illustrated therein being contemplated as would normally occur to one skilled in the art to which the invention relates.

Referring to FIG. 1, there is illustrated a drill bit holder and hexagonal-ended drill bit system 19. Together, this system 19 permits quick-changing of drill bits (and other types of bits as stated in the summary). The system 19 consists primarily of a holder 20 with attached safety split sleeve 22 and 23, and the drill bits 33 and 33-1. One end of holder 20 contains a rigidly attached hexagonal shaft 21 for insertion into the chuck of a drill. The shaft 21 measures approximately ¼" across flats for use in ¼" and larger drills. Shaft 21 extends inside holder 20 a sufficient amount to achieve rigidity and to prevent slipping (see FIG. 3). Holder 20 contains a magnet 38 inside abutted against shaft 21 (see FIG. 3). Magnet 38 is firmly attached to holder 20 to prevent movement.

Figure 2:
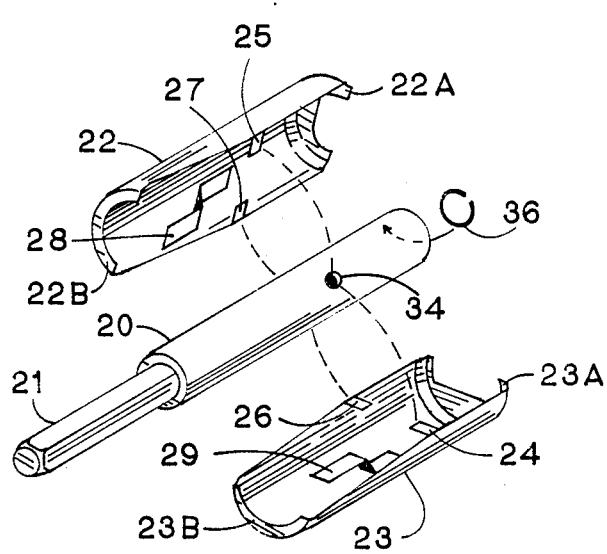
FIG. 2 is an exploded perspective view of the drill bit holder comprising a portion of FIG. 1.
Figure 3:
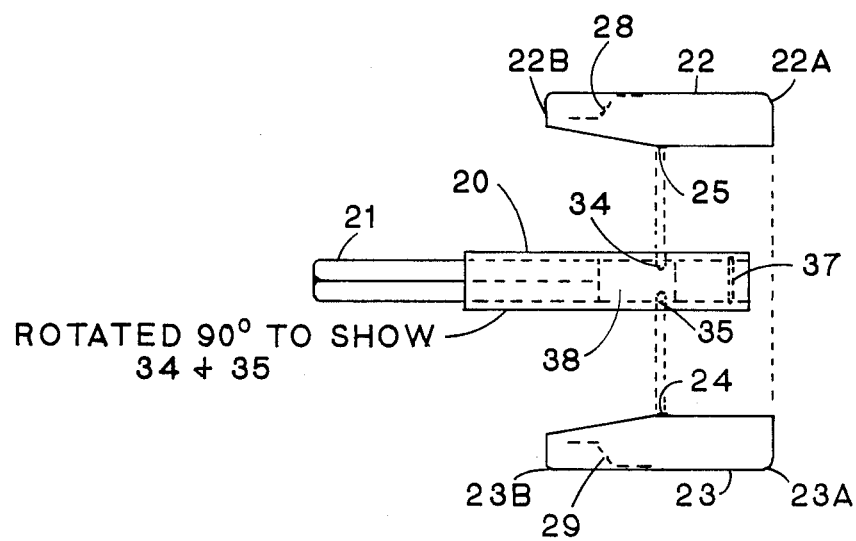
FIG. 3 is an exploded side elevation view of the drill bit holder comprising a portion of FIG. 1.

Referring to FIG. 3, holder 20 has two holes 34 and 35, opposite each other, centered and located approximately in the center longitudinally. These holes 34 and 35 accept tangs 24, 25 and 26, 27 respectively (see FIG. 2) to hold split sleeves 24 and 23 in place and permit split sleeves 22 and 23 to pivot. Inside holder 20 at the open end is a circular groove 37 to hold spring steel "C" ring 36 (see FIG. 2). This "C" ring engages in circular groove 31 of drill bit shaft 30 (see FIG. 1). Attached to holder 20 are split sleeves 22 and 23 shown attached in FIG. 1. These split sleeves 22 and 23 are a safety device which hold the drill bit 33 tightly in the holder 20 when removing bit 33 from material being worked. Without the split sleeves 22 and 23 the drill bit 33 could separate from holder 20 when bit 33 was removed from the work and could be spinning at high speed and conceivably fly away and cause personal injury. See FIG. 2 for an exploded view of these sleeves 22 and 23. Sleeve 22 has tangs 25 and 27 for insertion into holes 34 and 35 respectively on holder 20. Sleeve 23 has tangs 24 and 26 for insertion into holes 34 and 35 respectively on holder 20. The ends 22A and 23A of split sleeves 22 and 23 are folded over sufficiently to engage circular groove 32 of drill bit shaft 30 (see FIG. 1) when the sleeves 22 and 23 are in their installed position and springs 28 and 29 are extended. Squeezing split sleeve ends 22B and 23B causes the sleeves 22 and 23 to pivot at holes 34 and 35 in holder 20 thus opening opposite end for bit insertion and removal. Split sleeve ends 22B and 23B are also folded over slightly to permit a smooth, comfortable, finished surface. Split sleeve ends 22A and 23A extend beyond end of holder 20 (FIG. 3) to permit engagement into circular groove 32 of drill bit shaft 30 (see FIG. 1). The edges of split sleeves 22 and 23 from tangs 25, 27 and 24, 26 are cut slightly at an obtuse angle towards ends 22B and 23B (see FIG. 3) of sleeves 22 and 23 a sufficient amount to permit pivoting holes 34 and 35 of holder 20 a sufficient amount to permit ends 22A and 23A of split sleeves 22 and 23 to disengage from circular groove 32 of drill bit shaft 30.

Drill bit 33, typical of drill bits with a diameter smaller than drill bit shaft 30; and 33-1, typical of drill bits with a diameter larger than drill bit shaft 30, are shown in FIG. 1.

Drill bit shaft 30 is hexagonal in shape about 5/16" across flats. This increased size will prevent these drill bits from being used in currently manufactured holder without the safety provided by the split sleeves 22 and 23. The increased size will also overcome the loss of strength caused by the circular groove 32. About ⅛" of drill bit shaft 30 fits into holder 20, the inside of which is also hexagonal in shape and sized to fit the approximate 5/16" size of drill bit shaft 30. Drill bit shaft 30 has a circular groove 31 cut only into the high points of the hex shape to engage "C" ring 36 (see FIG. 2) inside holder 20. Drill bit shaft 30 also has a circular groove 32 to provide shoulders for the split sleeve ends 22A and 23A to hold against.

Figure 4:
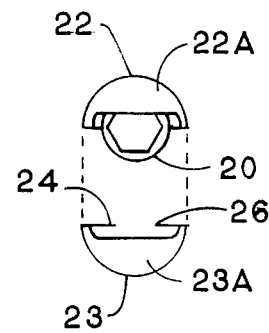
FIG. 4 is an end elevation view, partially exploded, of the drill bit end of the drill bit holder and split sleeves, comprising a portion of FIG. 1.

FIG. 4 is an end view of holder 20 showing the end 22A of split sleeve 22 in its installed position and overlapping the end of holder 20. Split sleeve 23 is shown removed from holder 20 and shows tangs 24 and 26.

Figure 5:
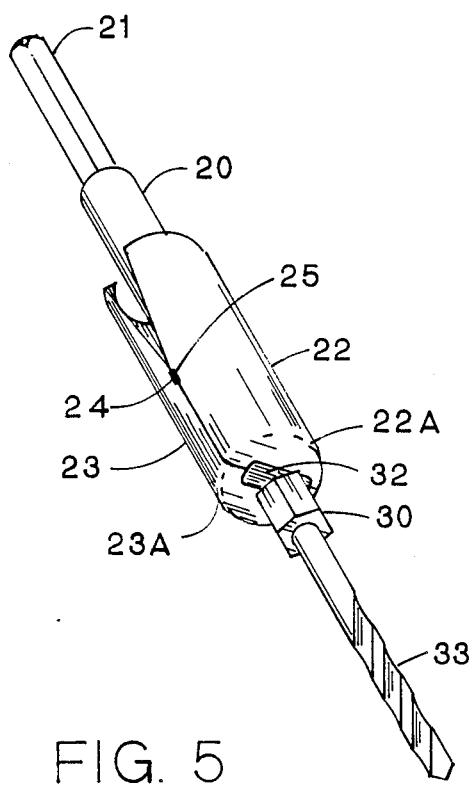
FIG. 5 is a perspective view of drill bit holder with attached split sleeve and a drill bit inserted into the holder.

FIG. 5 shows system 19 all together. The engagement of split sleeve ends 22A and 23A into circular groove 32 of drill bit shaft 30 can be seen. Position of tangs 24 and 25, and thus the pivot point, is shown.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. In combination: a holder with an attached part having an end for insertion into the chuck of a drill; the opposite end of said holder being a hollow cylinder, said hollow cylinder hexagonally shaped on the inside of the cylinder, a magnet inside said cylinder recessed sufficiently to receive a hexagonally ended drill bit into said cylinder; a "C" ring located inside the cylinder, said "C" ring made of spring steel, said "C" ring held in place by a circular groove; said holder further comprising a split sleeve having two portions connected to the holder in such a fashion as to permit each said portion to pivot in an arc relative to the axis of said holder, a shaped flat spring spanning between each said portion and the holder, each said spring being placed on the end of the portion adjacent the end of the holder which is inserted into the drill chuck; said portion being attached to said holder by means of a tang on opposite sides of each half of said portion and folded in toward said holder, said tangs fitted inside a circularly centered hole on each side of said holder, each said hole receiving one said tang from each said portion; the end of said portion facing the end that receives said drill bit extends slightly beyond the end of said holder and is folded over toward the axis of said holder a sufficient distance to engage the circular groove in said drill bit when said springs are in the extended or "at rest" position, but when said springs are compressed, the said distance will permit removal or insertion of said drill bit; the end of said portion facing the chuck is also slightly folded over toward the holder; the edges at each side of each said portion have an obtuse angle beginning at the tangs and continuing to the end of said portion that faces the drill chuck.

2. For use with a holder having a hollow cylinder containing a magnet and also comprising a split sleeve adapted to fit over said cylinder and functioning to help retain a drill bit within said cylinder: a drill bit comprising of a cutting portion of standard construction, said cutting portion being integral or securely fastened to an hexagonal end, said hexagonal end having a circular groove around the diameter of the hexagonal end closest to the cutting portion, said hexagonal end having "C" ring engagement notches located between said circular groove and the end of said hexagonal end; said hexagonal end being sized, both in diameter and length to engage effectively with an appropriate holder.

* * * * *